United States Patent
Aitharaju et al.

(10) Patent No.: US 10,723,271 B2
(45) Date of Patent: Jul. 28, 2020

(54) RUNNING BOARD CONFIGURED FOR ABSORBING ENERGY AND METHOD OF FORMING SAME

(71) Applicant: GM Global Technology Operations LLC, Detroit, MI (US)

(72) Inventors: Venkateshwar R. Aitharaju, Troy, MI (US); Hamid G. Kia, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 16/185,450

(22) Filed: Nov. 9, 2018

(65) Prior Publication Data

US 2020/0148121 A1 May 14, 2020

(51) Int. Cl.
| | |
|---|---|
| *B60R 3/00* | (2006.01) |
| *B60R 3/02* | (2006.01) |
| *B32B 5/18* | (2006.01) |
| *B32B 27/06* | (2006.01) |
| *B32B 27/40* | (2006.01) |
| *B29K 675/00* | (2006.01) |
| *B29L 31/30* | (2006.01) |
| *B29C 45/14* | (2006.01) |

(52) U.S. Cl.
CPC ............. *B60R 3/002* (2013.01); *B32B 5/18* (2013.01); *B32B 27/065* (2013.01); *B32B 27/40* (2013.01); *B60R 3/02* (2013.01); *B29C 45/14819* (2013.01); *B29K 2675/00* (2013.01); *B29K 2715/003* (2013.01); *B29L 2031/30* (2013.01); *B32B 2266/0278* (2013.01); *B32B 2605/00* (2013.01)

(58) Field of Classification Search
CPC .. B60R 3/002; B60R 3/02; B32B 5/18; B32B 27/065; B32B 27/04; B32B 2266/0278; B32B 2605/00; B29K 2715/003; B29K 2675/00; B29C 45/14819; B29L 2031/30
See application file for complete search history.

(56) References Cited

U.S. PATENT DOCUMENTS

| | | | | |
|---|---|---|---|---|
| 693,037 | A * | 2/1902 | Lemon ................... | B60R 3/002 280/169 |
| 961,176 | A * | 6/1910 | Stanwood ............... | B60R 3/002 280/169 |
| 3,599,757 | A * | 8/1971 | Takamatsu .............. | F16F 7/125 188/371 |
| 3,741,560 | A * | 6/1973 | Schaller ................. | B60R 19/30 267/134 |
| 4,078,837 | A * | 3/1978 | Auth ...................... | B60R 19/22 213/1 A |

(Continued)

*Primary Examiner* — Jacob B Meyer
(74) *Attorney, Agent, or Firm* — Quinn IP Law

(57) ABSTRACT

A running board configured for absorbing energy includes an attachment portion extending along a longitudinal axis and a step-assist portion extending from the attachment portion along a latitudinal axis that is perpendicular to the longitudinal axis. The attachment portion defines a plurality of voids therein each disposed along a respective one of a plurality of horizontal axes that are perpendicular to the longitudinal axis. The running board further includes a plurality of tubes disposed within a respective one of the plurality of voids. A device including the running board and a method of forming a running board are also set forth.

20 Claims, 2 Drawing Sheets

(56) References Cited

U.S. PATENT DOCUMENTS

| | | | | |
|---|---|---|---|---|
| 4,257,620 A * | 3/1981 | Okland | B60R 3/002 | 280/164.1 |
| 4,569,865 A * | 2/1986 | Placek | B29C 44/12 | 264/328.1 |
| 5,732,801 A * | 3/1998 | Gertz | F16F 7/123 | 188/377 |
| 6,267,398 B1 * | 7/2001 | Lombard | B60R 3/002 | 14/2.4 |
| 6,270,099 B1 * | 8/2001 | Farkash | B60R 3/002 | 182/127 |
| 6,382,650 B1 * | 5/2002 | Farkash | B60R 3/002 | 182/127 |
| 6,406,045 B1 * | 6/2002 | Farkash | B60R 3/002 | 280/164.1 |
| 6,592,135 B2 * | 7/2003 | Hendrix | B60R 3/002 | 14/71.1 |
| 6,702,345 B1 * | 3/2004 | Yoshida | B60R 19/34 | 188/377 |
| 6,854,574 B2 * | 2/2005 | Yoshida | F16F 7/125 | 188/371 |
| 6,905,136 B2 * | 6/2005 | Vidal | B60R 21/055 | 280/752 |
| 6,908,129 B2 * | 6/2005 | Shimotsu | B60R 19/34 | 293/132 |
| 7,393,029 B2 * | 7/2008 | Glasgow | B60N 2/4235 | 293/132 |
| 8,123,263 B2 * | 2/2012 | Evans | B60R 19/18 | 293/132 |
| 8,359,893 B2 * | 1/2013 | Pascual Barrio | B60R 19/34 | 72/367.1 |
| 9,452,723 B2 * | 9/2016 | Hahn | B60R 19/34 | |
| 9,855,877 B2 * | 1/2018 | Aftanas | B65G 69/30 | |
| 9,963,060 B1 * | 5/2018 | Vick | B60P 1/435 | |
| 2002/0195792 A1 * | 12/2002 | Hendrix | B60R 3/002 | 280/164.1 |
| 2003/0006575 A1 * | 1/2003 | Genis | B60R 3/002 | 280/163 |
| 2005/0093266 A1 * | 5/2005 | Smith | B60R 3/002 | 280/163 |
| 2006/0028038 A1 * | 2/2006 | Glasgow | B60N 2/4235 | 293/132 |
| 2006/0175791 A1 * | 8/2006 | Kaempe | B60R 3/002 | 280/166 |
| 2007/0187960 A1 * | 8/2007 | Evans | B60R 19/18 | 293/133 |
| 2015/0175079 A1 * | 6/2015 | Kmita | B60R 3/007 | 280/166 |
| 2015/0291116 A1 * | 10/2015 | Pi | B60R 13/04 | 280/164.1 |
| 2016/0185273 A1 * | 6/2016 | Aftanas | B65G 69/30 | 280/164.1 |
| 2018/0170266 A1 * | 6/2018 | Dellock | B60R 3/002 | |
| 2019/0126870 A1 * | 5/2019 | Rife | B60R 19/38 | |
| 2019/0263342 A1 * | 8/2019 | Rodgers | B60R 19/18 | |
| 2020/0022225 A1 * | 1/2020 | Dellock | H05B 3/146 | |

* cited by examiner

RUNNING BOARD CONFIGURED FOR ABSORBING ENERGY AND METHOD OF FORMING SAME

INTRODUCTION

The disclosure relates to a running board configured for absorbing energy, a device including the running board, and a method of forming the running board.

High ground clearance vehicles typically have a vehicle floor disposed at a high elevation. Certain types of high ground clearance vehicles, such as sport utility vehicles and pick-up trucks with an extended cab, often include both a front door and a rear door on one side of the vehicle, and are designed to carry multiple occupants. Because of the high elevation of the vehicle floor, ingress and egress of high ground clearance vehicles and/or access to a roof of the vehicle may be cumbersome for some occupants. To compensate for the high elevation, high ground clearance vehicles may include running boards to assist occupants during ingress and egress of the vehicle and/or to provide access to the roof of the vehicle.

SUMMARY

A running board configured for absorbing energy includes an attachment portion extending along a longitudinal axis and a step-assist portion extending from the attachment portion along a latitudinal axis that is perpendicular to the longitudinal axis. The attachment portion defines a plurality of voids therein each disposed along a respective one of a plurality of horizontal axes that are perpendicular to the longitudinal axis. The running board also includes a plurality of tubes disposed within a respective one of the plurality of voids.

In one aspect, adjacent ones of the plurality of tubes may be spaced apart from one another along the longitudinal axis. Further, one of the plurality of tubes may be disposed in each of the plurality of voids.

Each of the plurality of tubes may be formed from a composite material. In another aspect, each of the plurality of tubes may be cylindrical. Further, each of the plurality of tubes may be hollow.

In a further aspect, the step-assist portion may have a fixed end and a free end. In addition, the attachment portion may have a first thickness, the fixed end may have a second thickness that is less than the first thickness, and the free end may have a third thickness that is less than the second thickness.

The attachment portion may have a top surface and a bottom surface spaced apart from and parallel to the top surface. The step-assist portion may have a step surface that slopes away from the top surface and an underside surface spaced apart from the step surface and parallel to the bottom surface.

In yet another aspect, the attachment portion and the step-assist portion may include a core formed from a structural foam. In addition, the attachment portion and the step-assist portion may further include an outer layer disposed on and encasing the core and formed from a material including a fiber. The fiber may be at least one of carbon and glass.

In one aspect, the core may define a plurality of dimples therein each spaced apart from one another by from 35 mm to 110 mm and each having a depth of from 1 mm to 5 mm.

The running board may further include a plurality of fasteners embedded in the attachment portion and configured for attaching the running board to a device.

A device includes a frame defining a compartment therein and a battery disposed within the compartment adjacent the frame and configured for providing motive power to the device. The device also includes a running board attached to the frame. The running board is configured for absorbing energy transmitted to the frame upon contact between the running board and an object external to the frame. The running board includes an attachment portion extending along a longitudinal axis and a step-assist portion extending from the attachment portion along a latitudinal axis that is perpendicular to the longitudinal axis. The attachment portion defines a plurality of voids therein each disposed along a respective one of a plurality of horizontal axes that are perpendicular to the longitudinal axis. The running board also includes a plurality of tubes each disposed within a respective one of the plurality of voids.

In one aspect, the frame may include a rocker panel disposed parallel to the longitudinal axis, and the running board may further include a plurality of fasteners attached to the attachment portion and the rocker panel.

A method of forming a running board configured for absorbing energy includes forming a core having an attachment portion extending along a longitudinal axis and a step-assist portion extending from the attachment portion along a latitudinal axis that is perpendicular to the longitudinal axis. The method further includes defining a plurality of voids in the attachment portion each disposed along a respective one of a plurality of horizontal axes that are perpendicular to the longitudinal axis. The method also includes embedding each of a plurality of tubes within a respective one of the plurality of voids. Further, the method includes overmolding the core with an outer layer to thereby form the running board.

In one aspect, forming may include machining a structural foam. In another aspect, forming may include molding a structural foam.

In a further aspect, overmolding may include wrapping the core with the outer layer such that the outer layer is integral with the core.

In another aspect, forming may including defining a plurality of dimples in the core each spaced apart from each other by from 35 mm to 110 mm and each having a depth of from 1 mm to 5 mm.

The above features and advantages and other features and advantages of the present disclosure will be readily apparent from the following detailed description of the preferred embodiments and best modes for carrying out the present disclosure when taken in connection with the accompanying drawings and appended claims.

DETAILED DESCRIPTION

Figure 1:
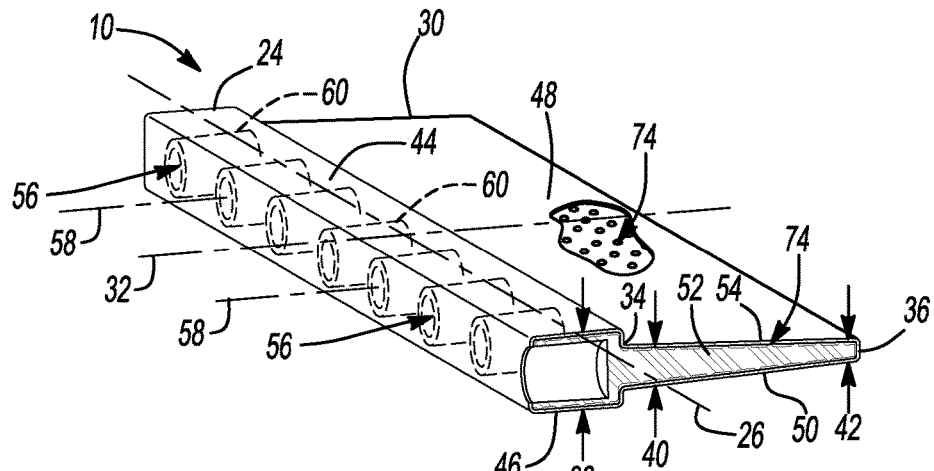
FIG. 1 is a schematic illustration of a cross-sectional perspective view of a running board configured for absorbing energy.
Figure 4:
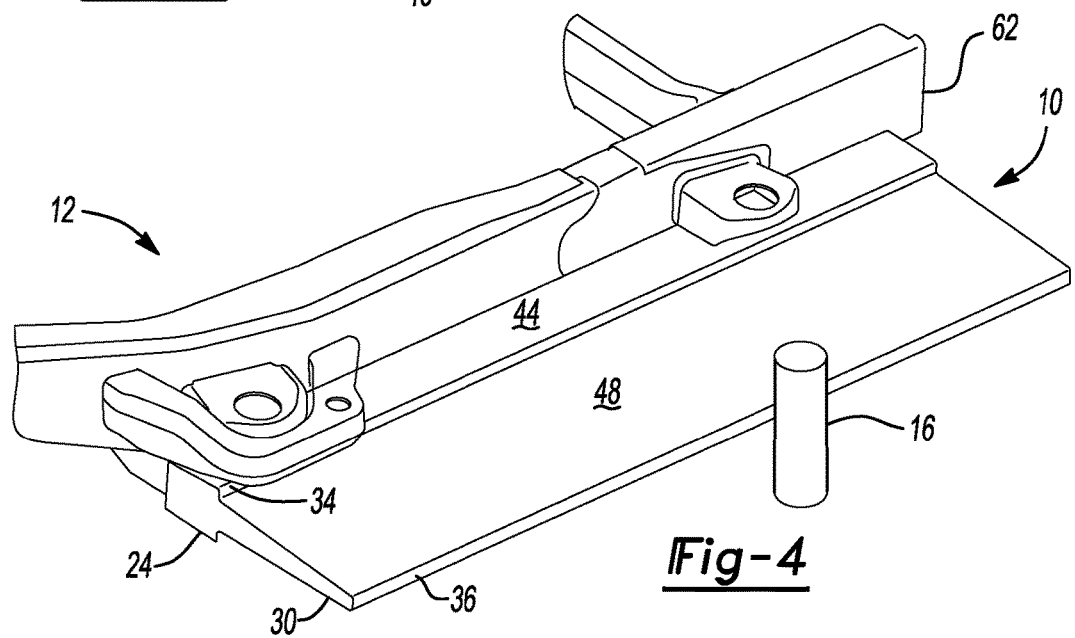
FIG. 4. is a schematic illustration of a perspective view of a portion of the device of FIG. 3.
Figure 3:
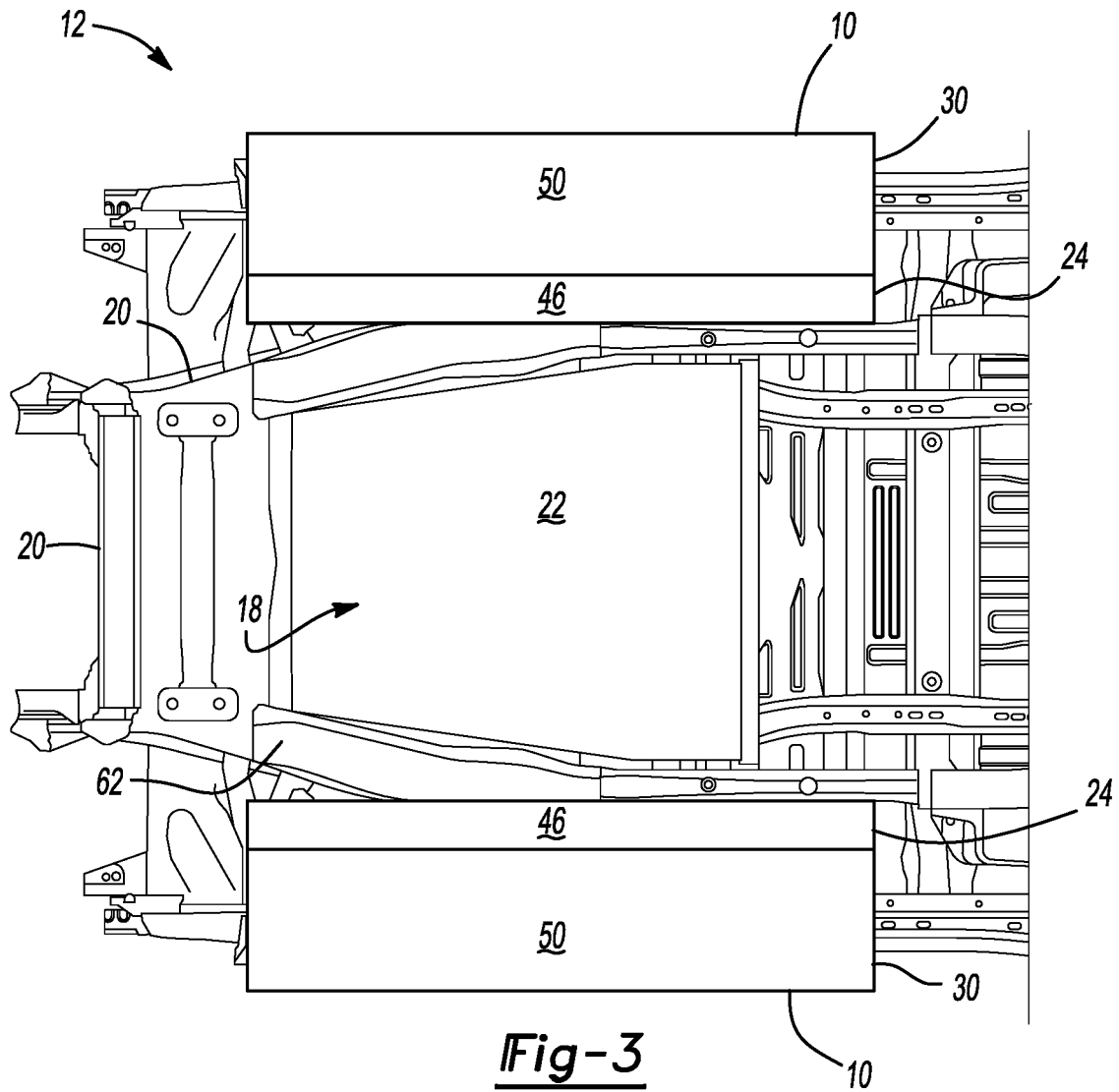
FIG. 3 is a schematic illustration of a plan view of an underside of a device including the running board of FIGS. 1 and 2.
Figure 5:
FIG. 5 is a flowchart of a method of forming the running board of FIGS. 1 and 2.

Referring to the Figures, wherein like reference numerals refer to like elements, a running board 10 for a device 12 is shown generally in FIGS. 1 and 3, and a method 14 of forming the running board 10 is shown generally in FIG. 5. The running board 10, device 12, and method 14 may be useful for applications requiring excellent energy absorption upon contact with an object 16 (FIG. 4) external to the device 12. In particular, the running board 10 is configured for absorbing energy such that the running board 10 may not intrude into a battery compartment 18 (FIG. 3) defined by a frame 20 of the device 12 and may not deform a battery 22 (FIG. 3) of the device 12 by more than 5 mm once the running board 10 contacts the object 16. As such, the running board 10 may provide excellent energy dissipation and simplification of components. Further, the method 14 may also be simplified as compared to other manufacturing methods and may be scalable to mass production operations. Therefore, the running board 10, device 12, and method 14 may be economical in terms of manufacturing time and cost.

Accordingly, the running board 10, device 12, and method 14 may be useful for vehicular applications such as, but not limited to, automobiles, buses, forklifts, trains, trams, trolleys, farming equipment, earthmoving or construction equipment, cranes, transporters, and the like. Alternatively, the running board 10, device 12, and method 14 may be useful for non-vehicular applications requiring excellent energy absorption and step-assist capabilities, such as disability-assistive products. By way of a non-limiting example, the running board 10, device 12, and method 14 may be useful for truck and sport utility vehicle applications for non-autonomous, autonomous, or semi-autonomous vehicle applications for which motive power is at least partially provided by the battery 22 (FIG. 3).

Figure 2:
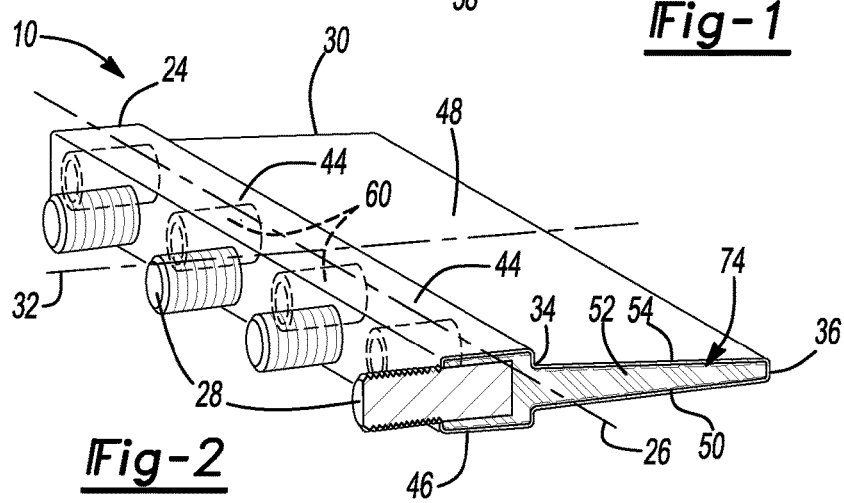
FIG. 2 is a schematic illustration of a cross-sectional perspective view of the running board of FIG. 1 including a plurality of fasteners.

Referring now to FIG. 1, the running board 10 configured for absorbing energy includes an attachment portion 24 extending along a longitudinal axis 26. The attachment portion 24 may be generally shaped as a rectangle that extends along the longitudinal axis 26 and may be configured for attaching to the device 12 (FIG. 4). In particular, as best shown in FIG. 2, the running board 10 may include a plurality of fasteners 28 embedded in the attachment portion 24 and configured for attaching the running board 10 to the device 12. For example, the attachment portion 24 may include a plurality of bolts or screws that may attach the attachment portion 24 to the device 12, as set forth in more detail below.

Referring again to FIGS. 1 and 2, the running board 10 also includes a step-assist portion 30 extending from the attachment portion 24 along a latitudinal axis 32 that is perpendicular to the longitudinal axis 26. The step-assist portion 30 may be integral with the attachment portion 24 and may extend away from the attachment portion 24 along the latitudinal axis 32. The step-assist portion 30 may be configured as a step that is suitably sized to assist a user with ingress to and egress from the device 12, e.g., ingress into and egress from a passenger compartment (not shown) of the device 12.

More specifically, as best shown in FIG. 4, the step-assist portion 30 may have a fixed end 34 and a free end 36. That is, the fixed end 34 may be integral with the attachment portion 24 and the free end 36 may be spaced apart from the attachment portion 24. In addition, the attachment portion 24 may have a first thickness 38, the fixed end 34 may have a second thickness 40 that is less than the first thickness 38, and the free end 36 may have a third thickness 42 that is less than the second thickness 40. That is, the step-assist portion 30 may gradually slope away from the attachment portion 24.

Further, as described with continued reference to FIG. 1, the attachment portion 24 may have a top surface 44 and a bottom surface 46 spaced apart from and parallel to the top surface 44. The step-assist portion 30 may have a step surface 48 that slopes away from the top surface 44 and an underside surface 50 that is spaced apart from the step surface 48 and parallel to the bottom surface 46. That is, the step surface 48 may gradually slope away from the attachment portion 24 to provide for fluid and debris drainage from the running board 10 and an ergonomic step into or out of the device 12.

As best shown in FIG. 1, the attachment portion 24 and the step-assist portion 30 may include a core 52 formed from a structural foam. For example, the structural foam may be a low density foam having a density of from 0.1 g/cm$^3$ to 1 g/cm$^3$, e.g., from 0.2 g/cm$^3$ to 0.5 g/cm$^3$ or 0.3 g/cm$^3$. The structural foam may be, for example, a polyurethane foam or a polyisocyanurate foam and may define closed cells therein. The structural foam may also be characterized as comparatively high-energy absorbing foam and may be lightweight. That is, the structural foam may be selected to absorb energy and may have a comparatively high stiffness.

In addition, referring again to FIGS. 1 and 2, the core 52 may define a plurality of dimples 74 therein each spaced apart from one another by from 35 mm to 110 mm and each having a depth of from 1 mm to 5 mm. That is, the plurality of dimples 74 may be a plurality of recessions or depressions in the core 52 that may have, for example, a hemispherical shape, an oblong shape, an irregular shape, a diamond shape or another shape suitable for anchoring or attaching an outer layer 54 to the core 52, as set forth in more detail below. The plurality of dimples 74 may be arranged in a pattern so that each dimple 74 is spaced apart from a neighboring dimple 74 by from 35 mm to 110 mm, e.g., from 50 mm to 105 mm, or from 65 mm to 90 mm, or about 75 mm. Further, each of the plurality of dimples 74 may be comparatively shallow and have a depth of from 1 mm to 5 mm, e.g., from 2 mm to 4 mm, or about 3 mm.

Referring again to FIGS. 1 and 2, the attachment portion 24 and the step-assist portion 30 further include the outer layer 54 disposed on and encasing the core 52 and formed from a material including a fiber. That is, the outer layer 54 may encapsulate the core 52 such that the running board 10 is a lightweight composite. Stated differently, the attachment portion 24 and the step-assist portion 30 may be integral with the outer layer 54 and form a unitary or one-piece running board 10. The outer layer 54 may protect the core 52 and may provide, for example, traction, mar-resistance, and durability for the step surface 48. Further, the fiber may be at least one of carbon and glass such that the outer layer 54 is formed from a fiber-reinforced material. Such fiber reinforcement may impart strength and durability to the outer layer 54 and running board 10.

More specifically, the outer layer 54 may settle into each of the plurality of dimples 74 to further anchor the outer layer 54 to the core 52 to increase the strength of the running board 10. That is, during formation of the running board 10, as set forth in more detail below, the material of the outer layer 54 may fill each of the plurality of dimples 74, which may in turn minimize separation of the outer layer 54 from the core 52 and enhance the strength of the running board 10.

Referring again to FIG. 1, the attachment portion 24 may define a plurality of voids 56 therein each disposed along a respective one of a plurality of horizontal axes 58 that are perpendicular to the longitudinal axis 26, i.e., parallel to one another. That is, the plurality of voids 56 may be spaced apart from one another along the longitudinal axis 26 and may extend into the attachment portion 24. However, the plurality of voids 56 may not extend into the step-assist portion 30.

In addition, as described with continued reference to FIG. 1, the running board 10 also includes a plurality of tubes 60 each disposed within a respective one of the plurality of voids 56. The plurality of tubes 60 may be configured to compress and deform as the running board 10 contacts the object 16 (FIG. 4). That is, upon contact with the object 16, the step-assist portion 30 may at least partially translate and transmit energy along the latitudinal axis towards the attachment portion 24. However, the plurality of tubes 60 may absorb and dissipate the energy via compression and deformation such that the attachment portion 24 and step-assist portion 30 may not deform another component of the device 12 by more than 5 mm, as set forth in more detail below.

Adjacent ones of the plurality of tubes 60 may be spaced apart from one another along the longitudinal axis 26. Further, one of the plurality of tubes 60 may be disposed in each of the plurality of voids 56. More specifically, each of the plurality of tubes 60 may abut the core 52 of the attachment portion 24 within the respective one of the plurality of voids 56 such that the plurality of tubes 60 reinforce the attachment portion 24 and provide an outlet for energy transmitted from the step-assist portion 30.

Each of the plurality of tubes 60 may be formed from a composite material. For example, each of the plurality of tubes 60 may be formed from carbon fiber, glass fiber reinforced composite, and the like such that the tubes 60 are strong yet deformable. Further, the plurality of tubes 60 may be hollow and have excellent stiffness. In one example, the plurality of tubes 60 may be cylindrical. In another example, although not shown, the plurality of tubes 60 may be conical and have a comparatively larger diameter at an end spaced apart from the step-assist portion 30. That is, the plurality of tubes 60 may have a conical shape that slopes from the attachment portion 24 towards the step-assist portion 30.

Referring now to FIG. 3, the device 12 includes a frame 20 defining the compartment 18 therein. The frame 20 may be a vehicle frame onto which other components of the device 12 are attached, such as, for example, an engine, a transmission, a body, and the like. In particular, the frame 20 may include a rocker panel 62 disposed parallel to the longitudinal axis 26, and the running board 10 may include the plurality of fasteners 28 attached to the attachment portion 24 and the rocker panel 62. That is, the running board 10 may be attached to the device 12 such that the longitudinal axis 26 is parallel to at least a portion of the frame 20 and a direction of travel of the device 12.

In addition, the device 12 includes the battery 22 disposed within the compartment 18 adjacent the frame 20 and configured for providing motive power to the device 12. For example, the battery 22 may be a secondary or rechargeable battery configured for converting energy and providing power to an electric powertrain of the device 12. In one example, the battery 22 may provide power to an electric traction motor. For example, the battery 22 may be a lithium-ion electrochemical cell. In another example, the battery 22 may provide power to electronic components of the device 12.

In yet another example, the battery 22 may be a secondary battery module or pack (not shown) configured for operation by electron transfer that includes multiple lithium-ion electrochemical cells. Therefore, battery 22 may be useful for automotive applications, such as for example, plug-in hybrid electric vehicles (PHEV), hybrid electric vehicles (HEV), battery electric vehicles (BEV), all-electric vehicles (AEV), and fuel cell electric vehicles (FCEV). Further, although not shown, a plurality of secondary battery modules may be combined to form a secondary battery or pack. That is, the secondary battery module may be connected to one or more other secondary battery modules to form the secondary battery. By way of example, the secondary battery module may be sufficiently sized to provide sufficient voltage for powering a plug-in hybrid vehicle (PHEV), hybrid electric vehicle (REV), battery electric vehicle (BEV), all-electric vehicle (AEV), and the like, e.g., approximately 300 to 400 volts or more, depending on the required application.

As shown generally in FIGS. 3 and 4, the running board 10 is attached to the frame 20 and is configured for absorbing energy transmitted to the frame 20 upon contact between the running board 10 and the object 16 external to the frame 20. In particular, the attachment portion 24 may not intrude into the compartment 18 by more than 5 mm and may not deform the battery 22 by more than 5 mm. Further, the step-assist portion 30 may not intrude into the compartment 18 by more than 5 mm and may not deform the battery 22 by more than 5 mm. Instead, as the step-assist portion 30 contacts the object 16, energy may be transmitted through the step-assist portion 30 to the attachment portion 24 such that the plurality of tubes 60 deform to dissipate or mitigate or absorb energy transferred to the frame 20, e.g., the rocker panel 62.

Referring now to FIG. 5, the method 14 of forming the running board 10 configured for absorbing energy includes forming 64 the core 52. As set forth above, the core 52 has the attachment portion 24 extending along the longitudinal axis 26 and the step-assist portion 30 extending from the attachment portion 24 along the latitudinal axis 32 that is perpendicular to the longitudinal axis 26. In one example, forming 64 may include machining the structural foam. That is, the structural foam may be cut or shaved into the desired shape set forth above. In another example, forming 64 may include molding the structural foam. That is, the structural foam may be formed inside a cavity (not shown) defined by a mold (not shown) and molded into the desired shape including the attachment portion 24 and the step-assist portion 30. Such molding of the structural foam may be suitable for mass production operations.

Forming 64 may also include defining the plurality of dimples 74 in the core 52 each spaced apart from one another by from 35 mm to 110 mm and each having a depth of from 1 mm to 5 mm. For example, forming 64 may include machining the plurality of dimples 74 into the core 52. That is, the plurality of dimples 74 may be cut or shaved into the desired pattern in the core 52. In another example, the plurality of dimples 74 may be molded into the core 52 during molding of the structural foam. That is, defining the plurality of dimples 74 may include constructing the core 52 around a plurality of protrusions (not shown) within the cavity of the mold so as to reserve the plurality of dimples 74 during forming 64 the core 52.

The method 14 also includes defining 66 the plurality of voids in the attachment portion 24 each disposed along the respective one of the plurality of horizontal axes 58 that are perpendicular to the longitudinal axis 26. For example, defining 66 may include carving the plurality of voids 56 out of the core 52 formed from structural foam at the attachment portion 24. Alternatively, defining 66 may include constructing the core 52 around a plurality of projections (not shown) within the cavity of the mold so as to reserve the plurality of voids 56 during forming 64 the core 52.

As described with continued reference to FIG. 5, the method 14 further includes embedding 68 each of the plurality of tubes 60 within the respective one of the plurality of voids 56. That is, the plurality of tubes 60 may be placed within the plurality of voids 56. For example, the plurality of tubes 60 may be adhered within the plurality of voids 56. Alternatively or additionally, the plurality of tubes 60 may be press fit into the plurality of voids 56. That is, the plurality of tubes 60 may not move or translate within the respective one of the plurality of voids 56 but may instead be fixed in place in preparation for absorbing energy transmitted from the step-assist portion 30 through the attachment portion 24.

In addition, the method 14 also includes overmolding 70 the core 52 with the outer layer 54 to thereby form the running board 10. That is, the formed core 52 or pre-mold including the attachment portion 24, the step-assist portion 30, and the plurality of tubes 60 disposed within the plurality of voids 56 may be transferred to a second mold (not shown). A resin or the fiber-reinforced material may be injection molded over the core 52 within the second mold to form the outer layer 54. Overmolding 70 may allow the core 52 and the outer layer 54 to be combined into the finished running board 10. That is, overmolding 70 may include wrapping the core 52 with the outer layer 54 such that the outer layer 54 is integral with the core 52 and the running board 10 is a composite. Since the outer layer 54 may be integral with the core 52, the running board 10 may be lightweight yet comparatively strong and stiff.

After overmolding 70, the method 14 may further include attaching 72 the plurality of fasteners 28 to the attachment portion 24 between the plurality of tubes 60. For example, the plurality of fasteners 28 may be adhered to or inserted into or the attachment portion 24. In one non-limiting example, the plurality of fasteners 28 may be threaded into the attachment portion 24.

Therefore, the running board 10, device 12, and method 14 may be useful for applications requiring excellent energy absorption upon contact with the object 16 external to the device 12. In particular, the running board 10 is configured for absorbing energy such that the running board 10 may not deform the battery 22 of the device 12 by more than 5 mm upon contact of the running board 10 with the object 16. As such, the running board 10 may provide excellent energy dissipation and simplification of components. Further, the running board 10 may be a lightweight yet stiff and strong composite that may eliminate weight and multiple components from the device 12. In addition, the method 14 may also be simplified as compared to other manufacturing methods and may be scalable to mass production operations. Therefore, the running board 10, device 12, and method 14 may be economical in terms of manufacturing time and cost.

While the best modes for carrying out the disclosure have been described in detail, those familiar with the art to which this disclosure relates will recognize various alternative designs and embodiments for practicing the disclosure within the scope of the appended claims.

What is claimed is:

1. A running board configured for absorbing energy, the running board comprising:
    an attachment portion extending along a longitudinal axis;
    a step-assist portion extending from the attachment portion along a latitudinal axis that is perpendicular to the longitudinal axis;
    wherein the attachment portion defines a plurality of voids therein each disposed along a respective one of a plurality of horizontal axes that are perpendicular to the longitudinal axis; and
    a plurality of tubes each disposed within a respective one of the plurality of voids.

2. The running board of claim 1, wherein adjacent ones of the plurality of tubes are spaced apart from one another along the longitudinal axis.

3. The running board of claim 2, wherein one of the plurality of tubes is disposed in each of the plurality of voids.

4. The running board of claim 1, wherein each of the plurality of tubes is formed from a composite material.

5. The running board of claim 1, wherein each of the plurality of tubes is cylindrical.

6. The running board of claim 1, wherein each of the plurality of tubes is hollow.

7. The running board of claim 1, wherein the step-assist portion has a fixed end and a free end, and further wherein the attachment portion has a first thickness, the fixed end has a second thickness that is less than the first thickness, and the free end has a third thickness that is less than the second thickness.

8. The running board of claim 1, wherein the attachment portion has:
    a top surface; and
    a bottom surface spaced apart from and parallel to the top surface; and
further wherein the step-assist portion has:
    a step surface that slopes away from the top surface; and
    an underside surface spaced apart from the step surface and parallel to the bottom surface.

9. The running board of claim 1, wherein the attachment portion and the step-assist portion include a core formed from a structural foam.

10. The running board of claim 9, wherein the attachment portion and the step-assist portion further include an outer layer disposed on and encasing the core and formed from a material including a fiber.

11. The running board of claim 10, wherein the fiber is at least one of carbon and glass.

12. The running board of claim 9, wherein the core defines a plurality of dimples therein each spaced apart from one another by from 35 mm to 110 mm and each having a depth of from 1 mm to 5 mm.

13. The running board of claim 1, further including a plurality of fasteners embedded in the attachment portion and configured for attaching the running board to a device.

14. A device comprising:
    a frame defining a compartment therein;
    a battery disposed within the compartment adjacent the frame and configured for providing motive power to the device;
    a running board attached to the frame, wherein the running board is configured for absorbing energy transmitted to the frame upon contact between the running board and an object external to the frame, the running board comprising:
        an attachment portion extending along a longitudinal axis;
        a step-assist portion extending from the attachment portion along a latitudinal axis that is perpendicular to the longitudinal axis;

wherein the attachment portion defines a plurality of voids therein each disposed along a respective one of a plurality of horizontal axes that are perpendicular to the longitudinal axis; and a plurality of tubes each disposed within a respective one of the plurality of voids.

15. The device of claim 14, wherein the frame includes a rocker panel disposed parallel to the longitudinal axis, and further wherein the running board includes a plurality of fasteners attached to the attachment portion and the rocker panel.

16. A method of forming a running board configured for absorbing energy, the method comprising:

forming a core having:

an attachment portion extending along a longitudinal axis; and a step-assist portion extending from the attachment portion along a latitudinal axis that is perpendicular to the longitudinal axis;

defining a plurality of voids in the attachment portion each disposed along a respective one of a plurality of horizontal axes that are perpendicular to the longitudinal axis; embedding each of a plurality of tubes within a respective one of the plurality of voids; and overmolding the core with an outer layer to thereby form the running board.

17. The method of claim 16, wherein forming includes machining a structural foam.

18. The method of claim 16, wherein forming includes molding a structural foam.

19. The method of claim 16, wherein overmolding includes wrapping the core with the outer layer such that the outer layer is integral with the core.

20. The method of claim 16, wherein forming includes defining a plurality of dimples in the core each spaced apart from one another by from 35 mm to 110 mm and each having a depth of from 1 mm to 5 mm.

* * * * *